United States Patent [19]
Yamaguchi et al.

[11] Patent Number: 5,607,116
[45] Date of Patent: Mar. 4, 1997

[54] FISHING REEL REVERSAL PREVENTIVE DEVICE

[75] Inventors: Nobuyuki Yamaguchi; Tomohiro Murayama, both of Tokyo, Japan

[73] Assignee: Daiwa Seiko, Inc., Tokyo, Japan

[21] Appl. No.: 272,430

[22] Filed: Jul. 11, 1994

[30] Foreign Application Priority Data

Jul. 14, 1993 [JP] Japan ................ 5-43261 U

[51] Int. Cl.$^6$ ........................................... A01K 89/027
[52] U.S. Cl. ............................... 242/247; 242/311
[58] Field of Search .................... 242/310, 311, 242/312, 313, 247, 248

[56] References Cited

U.S. PATENT DOCUMENTS

| | | | |
|---|---|---|---|
| 328,341 | 10/1885 | Roverts | 242/313 |
| 703,223 | 6/1902 | Atwood | 242/313 |
| 2,231,340 | 2/1941 | Lee | 242/313 |
| 2,559,433 | 7/1951 | Hurd | 242/313 |
| 3,788,570 | 1/1974 | Yamazaki et al. | 242/311 |
| 4,722,491 | 2/1988 | Myojo | 242/313 |
| 4,811,916 | 3/1989 | Yeh | 242/311 |

FOREIGN PATENT DOCUMENTS 59-3723  2/1984  Japan .

*Primary Examiner*—Katherine Matecki
*Attorney, Agent, or Firm*—Longacre & White

[57] ABSTRACT

A fishing reel reversal preventive device in which mounting of a switching operation shaft for operating a reversal preventive claw can be simplified to thereby facilitate the production of the reversal preventive device. The reversal preventive claw engageable with a reversal preventive ratchet wheel for preventing a fishing line from being played out is journaled on a reel casing, and the switching operation shaft having a cam part and an operation part for operating the claw to engage with or disengage from the ratchet wheel is held and supported rotatably between two support portions formed respectively on a main body and a cover member which constitute the reel casing.

13 Claims, 3 Drawing Sheets

FISHING REEL REVERSAL PREVENTIVE DEVICE

BACKGROUND OF THE INVENTION

The present invention relates to an improvement for a fishing reel reversal preventive device in a fishing reel, and in particular to a support structure for an operation shaft which is used to switch the reversal preventive device.

Japanese Utility Model Kokoku Publication No. Sho. 59-3723 discloses a typical reversal preventive means for preventing a fishing line from being played out in a fishing reel, which is switched from a reversal preventive condition to a reversal allowable condition or vice versa by operating a reversal preventive claw engageable with and disengageable from a reversal preventive ratchet wheel with the aid of a switching operation shaft supported in a reel main body.

In the conventional device, the switching operation shaft including a cam part for driving the reversal preventive claw and an operation part for manipulation is installed in the reel casing as follows: That is, first a portion of the switching operation shaft having the cam part is inserted into a support hole formed in the reel casing from the front side thereof, and then, the remaining part, i.e. the operation part is mounted onto the rear end of the switching operation shaft and they are fastened and fixed together by screws. Thus, the conventional device requires much time and labor to assemble the switching operation shaft into the reel casing and unavoidably requires the large number of the component parts. Consequently, the assembling efficiency in production is lowered, and the production cost is increased.

SUMMARY OF THE INVENTION

The present invention aims at eliminating these problems found in the conventional device. Accordingly, it is a primary objective of the invention to provide a fishing reel reversal preventive device which facilitates the assembling and mounting of a switching operation shaft for operating a reversal preventive claw to a reel casing.

In order to attain the above-noted and other objectives, the present invention provides a fishing reel reversal preventive device in which a switching operation shaft including a cam part and an operation part, through which a reversal preventive claw is operated to engage with or disengage from a reversal preventive ratchet wheel is held between and rotatably supported by a main body of a reel casing and a cover member.

The present invention further provides a structure for rotatably supporting a shaft onto a reel casing, the shaft including first and second portions located away from each other in an axial direction of the shaft and a third portion located between the first and second portions and smaller in size in a radial direction of the shaft than the first and second portions, and the reel casing including a reel main body and a cover to be fixed to the reel main body. The structure includes: a first support portion formed on one of the reel main body and the cover; and a second support portion formed on the other one of the reel main body and the cover, and mated with the first support portion when the cover is fixed to the reel main body, wherein the first and second support portions cooperatively support the third portion of the shaft.

According to the invention, the switching operation shaft including the cam part and operation part for operating the reversal preventive claw engageable with the reversal preventive ratchet wheel is held between and supported by the main body and the cover member, that is to say, the main body and the cover member cooperatively support the switching operation shaft when they are assembled together. Thus, at the time when the reel casing is assembled, the shaft can be incorporated into the reel casing with a simple manner.

BRIEF DESCRIPTION OF THE DRAWINGS

FIG. 4 is a section view taken along the line IV—IV in

DETAILED DESCRIPTION OF THE PREFERRED EMBODIMENTS

Figure 1:
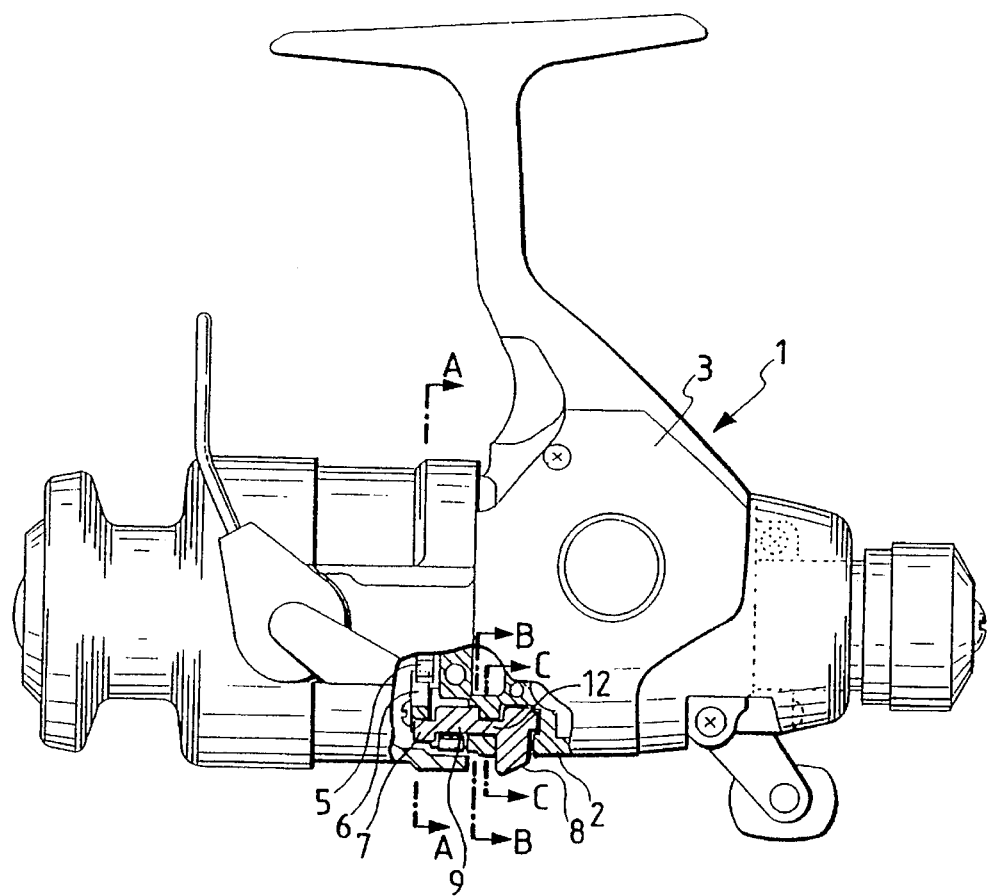
FIG. 1 is a partially broken front view of an embodiment of a reversal preventive device according to the invention.
Figure 2:
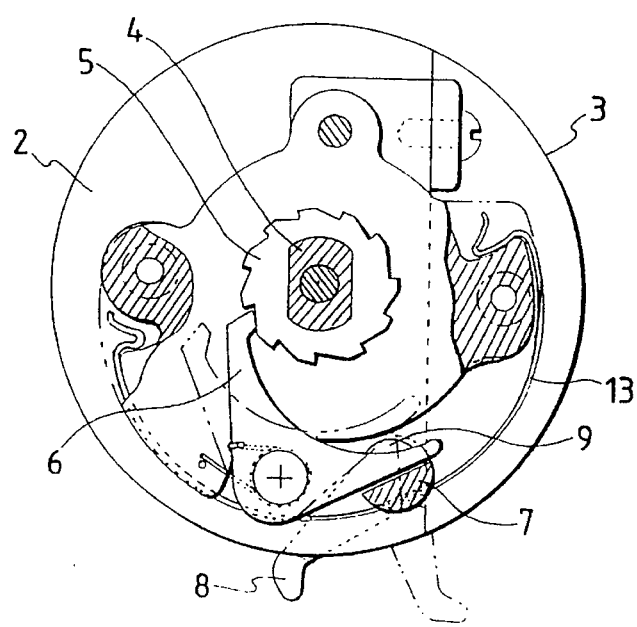
FIG. 2 is a section view taken along the line II—II in FIG. 1.
Figure 3:
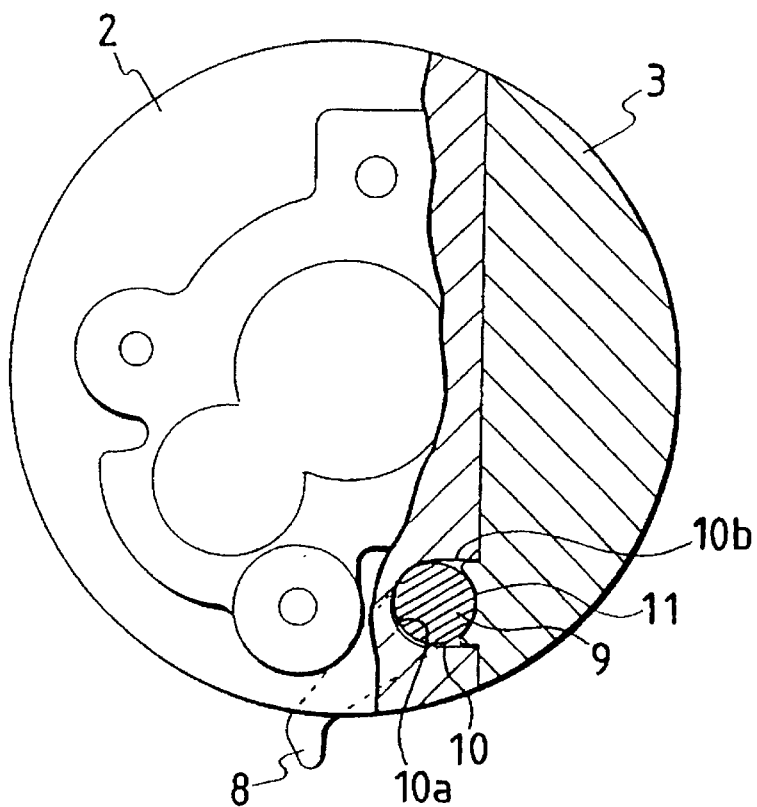
FIG. 3 is a section view taken along the line III—III in FIG. 1.
Figure 4:
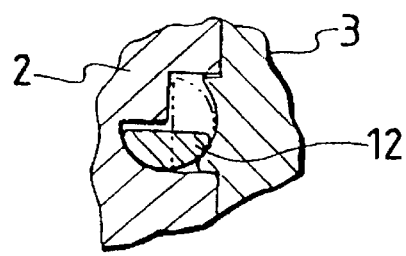

An embodiment of a fishing reel reversal preventive device according to the invention will now be described with reference to the accompanying drawings. A reel casing 1 of a spinning reel, as well-known, includes a main body 2 and a cover member 3 to be fixed to the main body 2 by screws. Within the reel casing 1, as well-known, there is provided a drive mechanism (not shown) for rotating a rotor rotation shaft cylinder 4. The rotor rotation shaft cylinder 4 includes a reversal preventive ratchet wheel 5 fixed thereto and, further, the front portion of the main body 2 axially supports a reversal preventive claw 6 which is engageable with and disengageable from the reversal preventive ratchet wheel 5.

The mating portions of the main body 2 and cover member 3 in the front portion of the reel casing 1 are respectively formed with first and second support portions 10 and 11 for supporting the switching operation shaft 9 of one-piece construction having an integral cam part (first portion) 7 in the leading end thereof and an integral operation part (second portion) 8 in the rear end thereof. In this embodiment, the support portion 10 has a semi-circular bottom 10a and a slot 10b through which a portion (third portion) of the switching operation shaft 9 can be inserted into the main body 2 in a radial direction of the shaft 9 or of the semi-circular bottom 10a so as to be installed in the main body 2. The switching operation shaft 9 is held and supported rotatably between and by the first and second support portions 10 and 11 respectively formed on the main body 2 and the cover member 3. In the drawings, reference character 12 designates a restricting shaft portion for restricting the range of rotation of the operation shaft 9; and 13, a plate spring which switchingly energizes the switching operation shaft 9 to one of an operative position and a non-operative position.

Since the present embodiment of the invention is structured in the above-mentioned manner, the switching operation shaft 9 including the cam part 7 and operation part 8, when the cover member 3 is fixed to the main body 2, is held and supported between and by the support portions 10 and 11 respectively formed on the main body 2 and the cover member 3. Once the present embodiment is manufactured and assembled, the switching operation shaft 9 can be rotated by the operation part 8 to operate the reversal preventive claw 6 into engagement with or disengagement from the reversal preventive ratchet wheel 5 through the cam part 7, so that the rotor rotation shaft cylinder 4 can be switched between its reversal preventive condition and reversal allowable condition in an ordinary manner.

Figure 5:
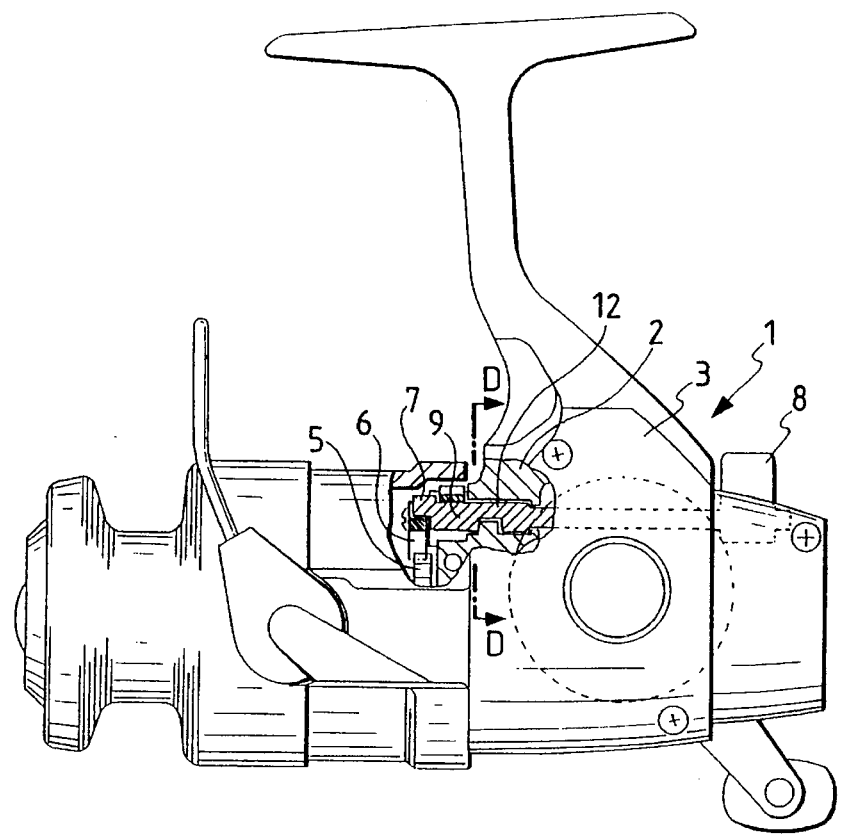
FIG. 5 is a partially broken front view of another embodiment of a reversal preventive device according to the invention.
Figure 6:
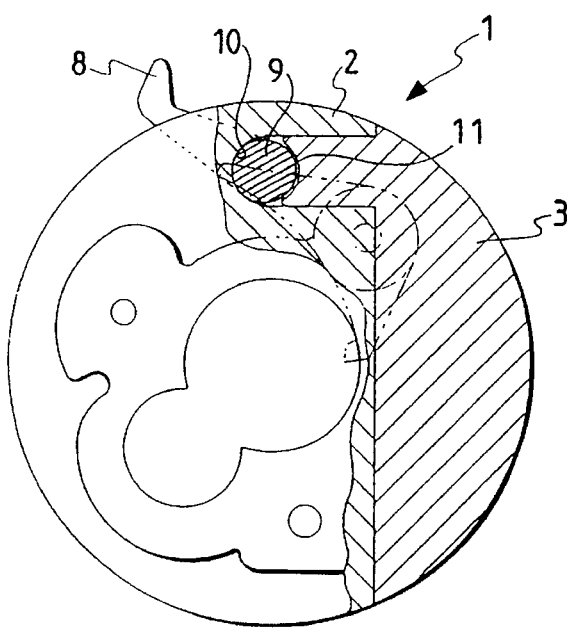
FIG. 6 is a section view taken along the line VI—VI in FIG. 5.

Now, in FIGS. 5 and 6, there is shown another embodiment of a fishing reel reversal preventive device according to the invention. In this embodiment, a switching operation shaft 9 is arranged such that it extends from the front portion of the reel box member 1 to the rear portion thereof.

In the embodiments as described before, the cam part 7 and operation part 8 are formed integrally with the switching operation shaft 9. However, this is not limitative but they can be formed as separate members and assembled together to form the switching operation shaft 9.

According to the invention, due to the fact that the switching operation shaft for operating the reversal preventive claw engageable with and disengageable from the reversal preventive ratchet wheel is held and supported rotatably between and by the main body and the cover member which form the reel casing, it is possible to simplify assembling of the switching operation shaft into the reel casing, and reduce the number of parts required, to thereby enhance the production efficiency and reduce the manufacturing cost. Also, according to the invention, when the cam part and operation part of the switching operation shaft are both formed integrally with the switching operation shaft, the assembling operation can be simplified further and the number of parts can be reduced further.

In addition, a support structure for rotatably supporting a switching operation shaft used in a reversal preventive device of a fishing reel has been described as an embodiment of the present invention, but the arrangement of the present invention can also be applied to other support structures in a fishing reel, which suffers from the similar problems as discussed in the "BACKGROUND OF THE INVENTION" section of this application.

What is claimed is:

1. A fishing reel including a reversal preventive device to prevent rotation of a rotor shaft, said rotor shaft being capable of rotating in a forward and reverse direction to drive a rotor, said reel comprising:

a reel casing;

a first means to prevent said rotor shaft from reverse rotation;

a switching operation shaft rotatably mounted onto said reel casing to switch said means to prevent said rotor shaft from reverse rotation from a free state in which said rotor shaft is free to rotate to a reverse rotation preventive state in which said rotor shaft is prevented from rotating in said reverse direction;

said switching operation shaft including first and second portions located away from each other in an axial direction of said switching operation shaft and a third portion located between said first and second portions, said third portion being smaller in size in a radial direction than said first and second portions;

said reel casing including:
      a reel main body; and
      a cover to be fixed to said reel main body;
      a first support portion formed on said reel main body;
      a second support portion formed on said cover mating with said first support portion when said cover is fixed to said reel main body, wherein said first and second support portions cooperatively support said third portion of said switching operation shaft.

2. The structure according to claim 1, wherein said first and second support portions cooperatively define a substantially circular inner face when said cover is fixed to said reel main body, said inner face rotatably supports said third portion of said switching operation shaft.

3. The structure according to claim 2, wherein said first portion includes a semi-circular bottom forming a part of said inner face and a slot through which said third portion is insertable into said first portion in said radial direction to reach said semi-circular bottom.

4. The structure according to claim 1, further comprising:
   a second means provided on said first support portion for restricting rotation of said switching operation shaft within a predetermined angular range.

5. A fishing reel as described in claim 1, wherein, said means to prevent said rotor shaft from reverse rotation comprises;
   a reversal preventive claw pivotably mounted to said main body; and
   a ratchet wheel fixedly and coaxially mounted to said rotor shaft;
      wherein rotation of said switching operation shaft causes said reversal preventive claw to pivot, said claw in turn engaging said ratchet wheel preventing reverse rotation of said rotor shaft.

6. A fishing reel including a reversal preventive device to prevent rotation of a rotor shaft, said rotor shaft being capable of rotating in a forward and reverse direction to drive a rotor, said reel comprising:
   a reel casing, said reel casing including;
      a main body having a first support portion;
      a cover member having a second support portion;
   said rotor shaft rotatably mounted to said reel casing;
   a ratchet wheel fixedly and coaxially mounted to said rotor shaft;
   a reversal preventive claw pivotably mounted to said main body engageable with said ratchet wheel so as to prevent reverse rotation of said rotor rotation shaft cylinder when engaged;
   a switching operation shaft having a first end and a second end,
   said operation shaft including:
      a cam part formed at said first end;
      an operation part formed at said second end;
      a restricting shaft portion formed between said first and second ends;
   said switching operation shaft being rotatably mounted between said first support portion of said main body and said second support portion of said cover member such that displacement of said operation part causes rotation of said switching operation shaft whereby said cam part engages said reversal preventive claw in turn causing said claw to pivot and engage said ratchet wheel.

7. A fishing reel as described in claim 6 further comprising;
   a plate spring having a first and second end, said first end attached to said main body, said second end attached to said reversal preventive claw biasing said claw into engagement with said ratchet wheel.

8. A fishing reel as described in claim 6 wherein said cover member is removably attached to said main body, whereby, removal of said cover exposes said switching operation shaft such that said switching operation shaft may be removed from said main body.

9. A fishing reel as described in claim 8 wherein, said cover member is fixed to said main body by a plurality of screws.

10. A fishing reel as described in claim 6, wherein said first support portion of said main body includes:
   a means to prevent the rotation of said switching operation shaft beyond a predetermined angle.

11. A fishing reel as described in claim 6, wherein said reel casing includes:
   a front portion; and
   a rear portion;
      said switching operation shaft being arranged such that it axially extends from said front portion of said reel casing towards said rear portion of said casing.

12. A fishing reel as described in claim 6, wherein said cam part, operation part and said restricting shaft portion of said switching operation shaft are integrally formed into a unitary shaft.

13. A fishing reel including a reversal preventive device to prevent rotation of a rotor shaft, said rotor shaft being capable of rotating in a forward and reverse direction to drive a rotor, said reel comprising:
   a reel casing, said reel casing including:
      a front portion and a rear portion;
      a main body having a first support portion;
      a cover member having a second support portion, wherein said cover member is removably attached to said main body by a plurality of screws;
   said rotor shaft rotatably mounted to said reel casing;
   a ratchet wheel fixedly and coaxially mounted to said rotor shaft;
   a reversal preventive claw pivotably mounted to said main body engageable with said ratchet wheel so as to prevent reverse rotation of said rotor shaft when engaged;
   a plate spring having a first and second end, said first end attached to said main body, said second end attached to said reversal preventive claw biasing said claw into engagement with said ratchet wheel;
   a switching operation shaft having a first end and a second end, said operation shaft including:
      a cam part integrally formed at said first end;
      an operation part integrally formed at said second end;
      a restricting shaft portion formed between said first and second ends;
   said switching operation shaft rotatably mounted between said first support portion of said main body and said second support portion of said cover member such that displacement of said operation part causes rotation therebetween, upon rotation, said cam part engages said reversal preventive claw in turn causing said claw to rotate and engage said ratchet wheel.

* * * * *